United States Patent [19]

Hindström et al.

[11] Patent Number: 4,981,589
[45] Date of Patent: * Jan. 1, 1991

[54] MULTI-LAYER CERAMIC FILTER

[75] Inventors: Rolf Hindström, Turku; Päivi Peltonen, Raisio, both of Finland

[73] Assignee: Valmet Paper Machinery Inc., Finland

[*] Notice: The portion of the term of this patent subsequent to Oct. 15, 2006 has been disclaimed.

[21] Appl. No.: 267,122

[22] PCT Filed: Feb. 8, 1988

[86] PCT No.: PCT/FI88/00018
§ 371 Date: Oct. 28, 1988
§ 102(e) Date: Oct. 28, 1988

[87] PCT Pub. No.: WO88/06480
PCT Pub. Date: Sep. 7, 1988

[30] Foreign Application Priority Data

Mar. 5, 1987 [FI] Finland .................................. 870979

[51] Int. Cl.⁵ .............................................. B01D 29/00
[52] U.S. Cl. ............................. 210/490; 210/497.01; 210/504; 210/506; 210/503
[58] Field of Search ............ 210/489, 504, 500.1, 210/503, 497.01, 437, 490, 506; 427/376.2; 501/80, 127, 128, 130, 131, 144

[56] References Cited

U.S. PATENT DOCUMENTS

| | | | |
|---|---|---|---|
| 3,414,394 | 12/1968 | Poad | 210/510.1 |
| 3,556,304 | 2/1971 | Collard et al. | 210/489 |
| 3,561,494 | 2/1971 | Hackett | 501/80 |
| 3,947,363 | 3/1976 | Pryor et al. | 501/80 |
| 4,041,195 | 8/1977 | Dussaussoy | 55/503 |
| 4,343,704 | 8/1982 | Brockmeyer | 501/80 |
| 4,356,215 | 10/1982 | Auriol et al. | 55/523 |
| 4,357,758 | 11/1982 | Lampinen | 34/9 |
| 4,381,998 | 5/1983 | Roberts et al. | 210/506 |
| 4,391,918 | 7/1983 | Brockmeyer | 501/127 |
| 4,395,333 | 7/1983 | Groteke | 210/500.1 |
| 4,452,698 | 6/1984 | Roberts et al. | 210/503 |
| 4,528,099 | 7/1985 | Rieger et al. | 210/489 |
| 4,629,483 | 12/1986 | Stanton | 55/487 |
| 4,746,341 | 6/1988 | Komoda | 501/80 |
| 4,792,358 | 12/1988 | Kimura et al. | 427/376.2 |
| 4,874,516 | 10/1989 | Kondo | 210/497.01 |

FOREIGN PATENT DOCUMENTS 0097114 12/1983 European Pat. Off. .
2327090 5/1977 France .
60-106514 6/1985 Japan .

Primary Examiner—Richard V. Fisher
Assistant Examiner—Cynthia L. Nessler
Attorney, Agent, or Firm—Steinberg & Raskin

[57] ABSTRACT

The invention concerns a filter construction in particular for suction driers. The filter construction comprises a first filter material layer (1) of a ceramic material, which is the first layer in relation to the flowing liquid, and a second filter material layer (2) of a ceramic material, connected with said first layer. The first filter material layer (1) acts as the filtering layer proper, and the second filter material layer (2) acts as a layer that supports the construction. The invention also concerns a method for the formation of the filter construction.

2 Claims, 2 Drawing Sheets

MULTI-LAYER CERAMIC FILTER

BACKGROUND OF THE INVENTION

The invention concerns filter construction and a method for the formation of a filter construction.

In prior-art ceramic filter plates, which were already patented by Valmet earlier, the filter construction favourably comprises a first suction face and a second suction face, between which there is a space filled by granules. The said intermediate space acts as a water space or liquid space, into which the liquid sucked out of the material to be filtered is sucked first. The granules or equivalent are substantially confined by the first face and by the second face, and they act as rigidifiers of the construction. The granularity does, however, not prevent the flow of the liquid that has entered into the space, because the granules do not cause a high resistance to flow. Into the central space, a connecting duct is passed, which can further be connected to a source of negative pressure so as to produce flow of liquid through the suction faces into the central space and further out of the filter plate. In the filter construction, the suction faces of the plate are preferably made of a ceramic casting mix.

Filter constructions are known in which the filtering face of the filter consists of a synthetic membrane. However, a major drawback in the case of membrane filters is the risk of damage to the film on cleaning.

SUMMARY OF THE INVENTION

The object of the invention is such a filter construction and such a ceramic filter construction in which it has been possible to increase the flow rate of the liquid sucked out of the material to be filtered to a considerable extent as compared with the solutions of prior art and whereat, by means of the filter construction concerned, it is possible to increase the filtering capacity of the whole suction drier considerably. In accordance with the invention, a filter construction of an entirely novel type has been formed, wherein it has been possible to intensify the flow rate of liquid to a considerable extent.

The filter construction in accordance with the invention is mainly characterized in that the filter construction comprises a first filter material layer of a ceramic material, which is the first layer in relation to the flowing liquid, and a second filter material layer of a ceramic material, connected with said first layer, whereat the first filter material layer, relative the flow, acts as the filtering layer proper, and the second filter material layer acts as a layer that supports the construction.

The method in accordance with the invention for the formation of a filter construction is mainly characterized in that first a second filter material layer is formed as the inner layer, and onto its face ceramic mix is sprayed so as to form a first filter material layer, i.e. the surface layer, or upon drying of the second filter material layer the dry piece is submerged into a ceramic mix, and the said ceramic mix is allowed to adhere as a thin layer onto the second filter material layer.

The filter construction in accordance with the invention is used in connection with suction driers for the dewatering of web-like material such as paper, floury material such as peat, solid, such as wood, porous material. By the intermediate of a finely porous suction face filled with liquid, the object to be dewatered is brought into hydraulic connection with a liquid subjected to negative pressure relative the object to be dewatered.

The flow rate of water in a porous material complies with Darcy's law: the flow rate is proportional to the difference in pressure and inversely proportional to length of flow. Thus, in an attempt to increase the flow rate, the length of the flow passage in the filter material should be made shorter. Thus, the filtering layer should be as thin as possible.

According to the invention, a two-part filter construction of a ceramic material is formed, wherein the surface layer, which is the first layer in the direction of flow of the filtered liquid, acts as the filtering layer proper and is thin, being of a thickness of even 0.3 mm. The said filtering surface layer is connected with an inner layer, which is considerably thicker than the surface layer and acts as a support layer. The thickness of the said inner layer is favourably about 2.7 mm. By means of the construction in accordance with the invention, a flow rate of up to 1 mm/s is obtained for the filtered liquid. The said flow rate is high as compared with the flow rate obtained with single-part ceramic faces, which remains even below 0.2 mm/s. It is characteristic of the filter material in accordance with the invention that the predominant pore size of its first filter material layer, i.e. the surface layer, is 1.5 μm, and that the predominant pore size of the second filter material layer, i.e. the inner layer, in the said filter material is up to 6 μm.

In the method in accordance with the invention, for the formation of the filter material, first the inner layer, i.e. the second filter material layer, is formed, and upon drying of the said layer, the surface layer, i.e. the first filter material layer, is formed. The said surface layer can be formed either by spraying onto the second filter material layer or by submerging the second filter material layer in the surface-layer material, whereby the surface layer adheres onto the said inner layer.

BRIEF DESCRIPTION OF THE DRAWINGS

The invention will be described in the following with reference to some preferred embodiments of the invention shown in the figures, the invention being, however, not supposed to be confined to said embodiments only.

DESCRIPTION OF THE PREFERRED EMBODIMENTS

Figure 1:
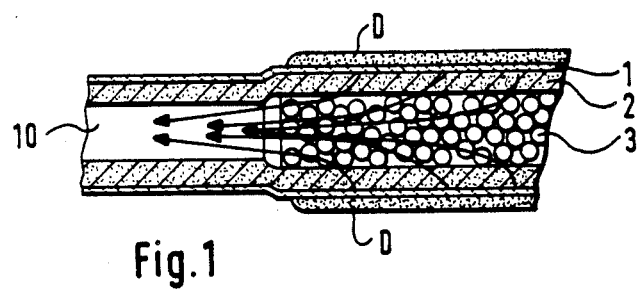
FIG. 1 is a cross-sectional view of a ceramic filter plate which comprises a filter material construction in accordance with the invention, consisting of a thin surface layer and of a connected inner layer.

According to the invention, the ceramic filter comprises a dual-ceramic construction, which gives the filter material a multiple permeability. According to the invention, the filter construction comprises a first filter material layer, preferably a ceramic surface layer, which is very thin, favourably less than 0.2 mm and preferably 0.1 mm. According to the invention, the first thin filter material layer 1 is connected with a second filter material layer 2, which is an inner layer.

The following is a non-restrictive example:

The composition of materials of the first filter material layer 1, i.e. the first layer in the direction of flow of the liquid, is the following:

| | |
|---|---|
| $Al_2O_3$ (Gilax 20) (Alcoa) Alumina | 30 to 50% |
| $Al(OH)_3$ (ON 320) (Martinswerk) Alumina Hydroxide | 5 to 15% |
| Talc (AT.1) (Norwegian Talc) Talcum | 20 to 30% |
| Clay (Hywite Alum) (ECC) Clay | 20 to 30% |
| Dispex N40 Polyacrylate, dispersing | 1 to 5 ml/kg dry matter |
| Water | 20 to 30% |

The first filter material layer 1 is connected with a second filter material layer 2, which is the inner layer, and its composition is as follows:

| | |
|---|---|
| $Al_2O_3$ (DK 206) (Martinswerk) Alumina | 50 to 60% |
| $Al(OH)_3$ (OL 104) (Martinswerk) Aluminum hydride | 3 to 7% |
| Clay (HP 64) (ECC) Clay | 10 to 15% |
| Kaolin (GE) (ECC) Kaolin | 18 to 25% |
| Chalk POLCARB 60 (ECC) Calcium Carbonate | 1 to 5% |
| Dispex (N40) Polyacrylate, dispersing agent | 0.5 to 4 ml/kg dry matter |
| Water | 19 to 25% |

The pore size of the first filter material layer 1 is about 1.0 to 3 mm, bubble point 1.5 bar, flow rate of filtered liquid 2.0 mm/s, and thickness of layer about 0.1 to 1 mm, and in the present example 0.3 mm.

The pore size of the second, thicker filter material layer 2, i.e. the inner layer, connected with the said first filter material layer, is 4 to 50 $\mu$m, and preferably substantially 4 to 10 $\mu$m. The bubble point is 0.5 bar, the flow rate of the liquid filtered from the filtered material 2.0 mm/s, and a preferred thickness of the said layer is within the range of 2 to 6 mm, and in the present example 2.7 mm.

The ratio of the predominant pore sizes in the layers 1 and 2 is at least 2, at the maximum 50.

The construction in accordance with the invention comprises both a first filter material layer 1, i.e. a surface layer, and a second filter material layer 2, i.e. an inner layer, connected with the said surface layer 1. The bubble point of the dual-ceramic construction in accordance with the present invention is still 1.5 bar, the flow rate of the filtered liquid in the said construction is about 1 mm/s, and the overall thickness of the said construction is thereat 3 mm.

The corresponding properties of a single-layer ceramic filter material of prior art are: pore size 1.5 $\mu$m, bubble point 1.5 bar, flow rate 0.2 mm/s, and thickness of layer 3 mm.

It is seen that by means of a construction in accordance with the invention, an approximately fivefold flow rate of filtered liquid is achieved as compared with a prior-art solution.

The filter construction in accordance with the invention is manufactured so that first the second filter material layer 2, i.e. the inner layer, is manufactured as slurry casting or by means of the extrusion method. As slurry casting, it is possible to manufacture complicated pieces, such as sector plates. Extrusion can be applied in the manufacture of tubular pieces and of rectangular plates.

Next, the first filter material layer 1 is formed, which is the surface layer, so that the dried piece, which forms the second filter material layer 2, is submerged into a ceramic mix for the time of a few seconds so that a sufficiently thick layer, of about 0.1 to 1 mm, is formed on the surface.

Another embodiment in the formation of the surface layer, i.e. of the first filter material layer 1, is that, after the inner layer, i.e. the second filter material layer 2, has become dry, the surface material is sprayed onto the said layer.

After both of the layers 1 and 2 have been formed, the piece is dried and fired at a temperature of about 1360° C., the temperature being raised over about 10 hours, and the raised temperature is maintained for about two hours.

The ratio of the predominant pore sizes ($\mu$inner layer/$\mu$surface layer) is 2 to 50.

FIG. 1 illustrates the filter material construction in accordance with the invention in connection with filter plates. The figure is a sectional view of the filter plate, whereat the filter plate comprises a granular innermost layer and a connected filter material construction in accordance with the invention, comprising a first filter material layer 1, which is the surface layer, and a second filter material layer 2, which is the connected inner layer. The figure shows the direction of flow of the liquid sucked out of the material to be filtered, and the figure further includes a layer D of the material to be filtered, which adheres to both sides of the suction-drier plate by the effect of negative pressure. The construction further comprises a space 10, into which the liquid (arrows) is first sucked and which space 10 is filled with a third layer 3, which supports the construction and which is made of a granular ceramic material.

Figure 2:
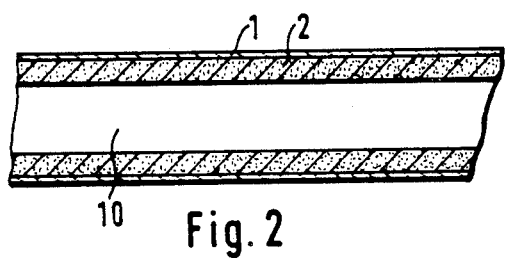
FIG. 2 shows a tube construction in which the filter construction in accordance with the invention is used.

FIG. 2 shows a tube embodiment, in which a ceramic tube made of a material in accordance with the invention comprises a first filter material layer 1 as the surface layer, the thickness of said layer being preferably 0.3 mm, and a connected filter material layer 2, i.e. the inner layer, whose thickness is preferably 2.7 mm.

Figure 3:
FIG. 3 shows a plate construction provided with layers in accordance with the invention.

FIG. 3 shows an extruded plate in accordance with the invention, made of a ceramic material. The construction in accordance with the invention comprises a first filter material layer 1 of a thickness of 0.3 mm as the surface layer and an inner, second filter material layer 2. Inside the plate there are suction spaces, which are denoted with the reference numeral 10 and into which the liquid sucked out of the material to be filtered is transferred first.

Figure 4:
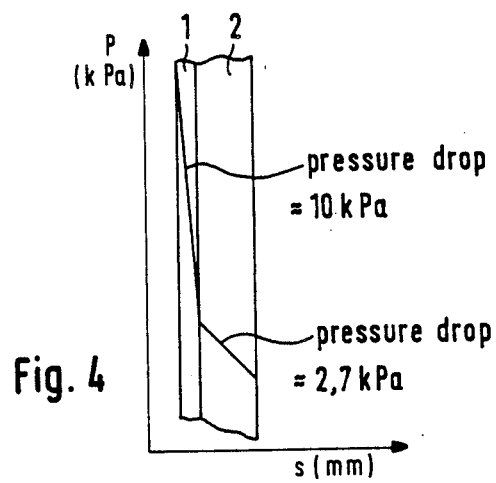
FIG. 4 shows a pressure diagram in a filter material construction in accordance with the invention.

FIG. 4 is a sectional view of a filter construction in accordance with the invention. In the figure, the pressure drop at each filter material layer is shown graphically. From the figure it is seen that the filtering layer proper, i.e. the first filter material layer 1, drops the pressure considerably more than the second filter material layer 2. The pressure drop at the first filter material layer 1 is up to 10 kPa, whereas, with a corresponding pressure difference across the filter material, the pressure drop at the second filter material layer 2 is only 2.7 kPa. It follows from this further that the second filter material layer 2 of ceramic material does not prevent the liquid flow to a major extent, but the greatest flow retardant is the first filter material layer 1. A significant advantage obtained by means of the construction in accordance with the invention is that the filter construction is easy to clean.

Figure 5:
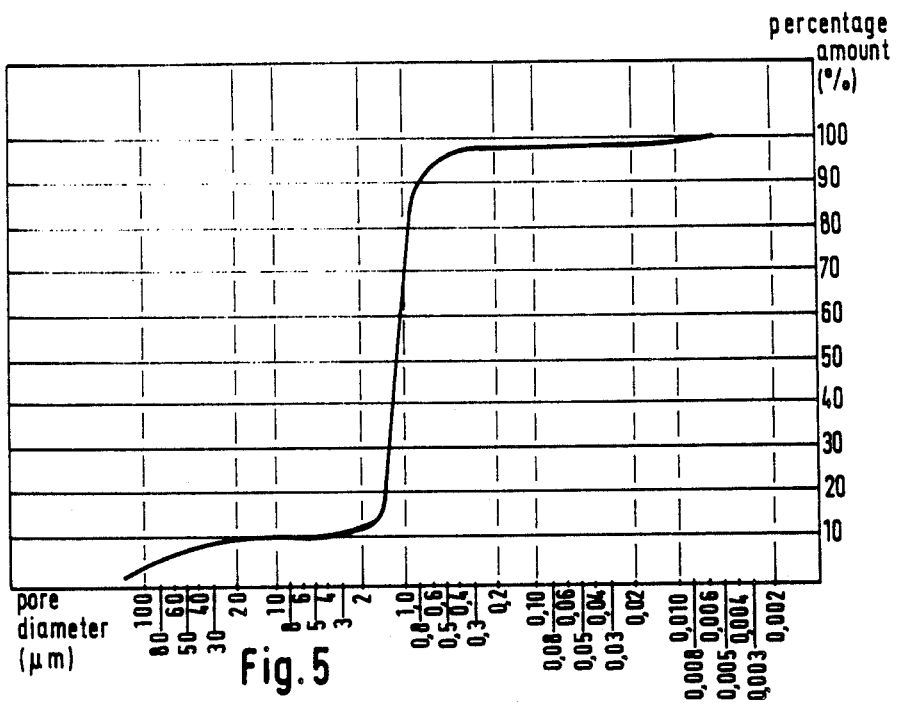
FIG. 5 shows the pore distribution in the surface material, i.e. the first filter material layer, in the filter construction of the invention.

FIG. 5 shows the pore size distribution in the first filter material layer 1, i.e. the surface layer, in the filter material construction of the invention cumulatively. From the figure it is seen that the predominant pore size is 1.5 μm.

Figure 6:
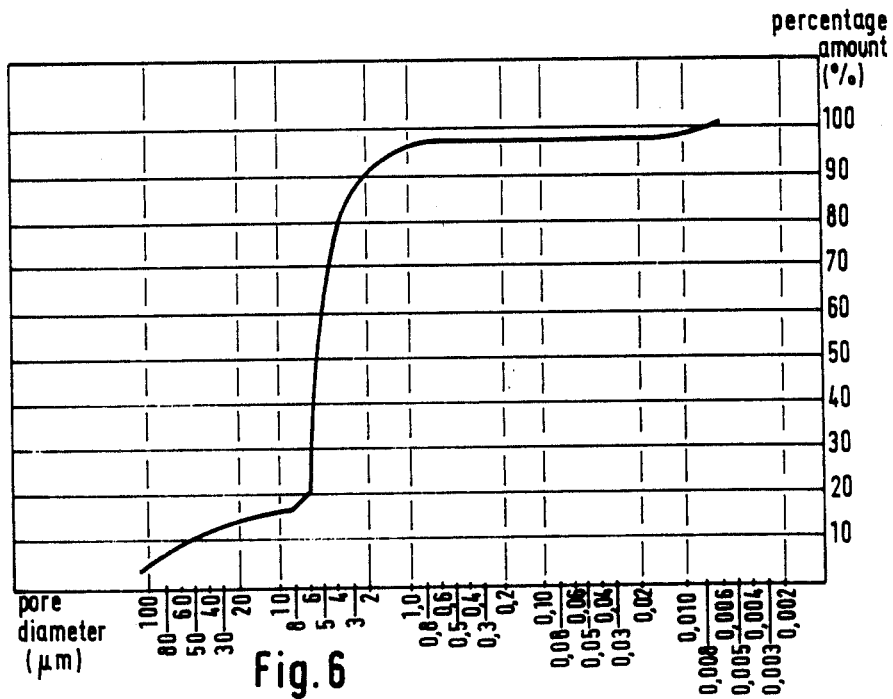
FIG. 6 shows the pore distribution in the inner layer, i.e. the second filter material layer, in the filter construction in accordance with the invention.

FIG. 6 shows the pore size distribution in the second filter material layer 2, i.e. the inner layer, related to the filter material of the invention cumulatively. From the figure it is seen that the predominant pore size is about 6 μm.

What is claimed is:

1. Filter construction, comprising a first filter material layer (1) of a ceramic material, which is a first layer in relation to flowing liquid, a second filter material layer (2) of a ceramic material, connected with said first layer (1), said first filter material layer (1) having a pore size in the range of about 1 to 3 microns, and acting as a filtering layer proper relative to the flowing liquid, said second filter material layer (2) having a pore size within the range of about 4 to 50 microns, and acting as a layer supporting the construction, said filter construction being tubular and defining an inner space (10) therewithin, said inner space (10) being arranged to receive liquid material to be filtered that passes initially through said first filter material layer (1) and subsequently through said second filter material layer (2), said filter construction additionally comprising a third filter material layer (3) fitted to be supported against said second filter material layer (2) and fitted in said inner space (10), and into which the filtered liquid is suctioned by means of negative pressure, and wherein said third layer is formed of granular material.

2. Filter construction, comprising a first filter material layer (1) of a ceramic material, which is a first layer in relation to flowing liquid, a second filter material layer (2) of a ceramic material, connected with said first layer (1), said first filter material layer (1) having a pore size in the range of about 1 to 3 microns, and acting as a filtering layer proper relative to the flowing liquid, said second filter material layer (2) having a pore size within the range of about 4 to 50 microns, and acting as a layer supporting the construction and in said filter construction, material to be filtered initially contacts said first filter material layer (1) and is hydraulically connected to said flowing liquid, wherein said first filter material layer (1) has the following composition:

| | |
|---|---|
| Alumina | 30 to 50% |
| Alumina Hydride | 5 to 15% |
| Talcum | 20 to 30% |
| Clay | 20 to 30% |
| Polyacrylate, dispersing agent | 1 to 5 ml/kg dry matter |
| Water | 20 to 30% | and said second filter material layer (2), has the following composition:

| | |
|---|---|
| Alumina | 50 to 60% |
| Alumina Hydride | 3 to 7% |
| Clay | 10 to 15% |
| Kaolin | 18 to 25% |
| Calcium carbonate | 1 to 5% |
| Polyacrylate, dispersing agent | 0.5 ... 4 ml/kg dry matter |
| Water | 19 to 25%. |

* * * * *